April 28, 1970   M. T. CORY   3,508,871
CARBONIZING FIBROUS MATERIALS
Filed May 29, 1963
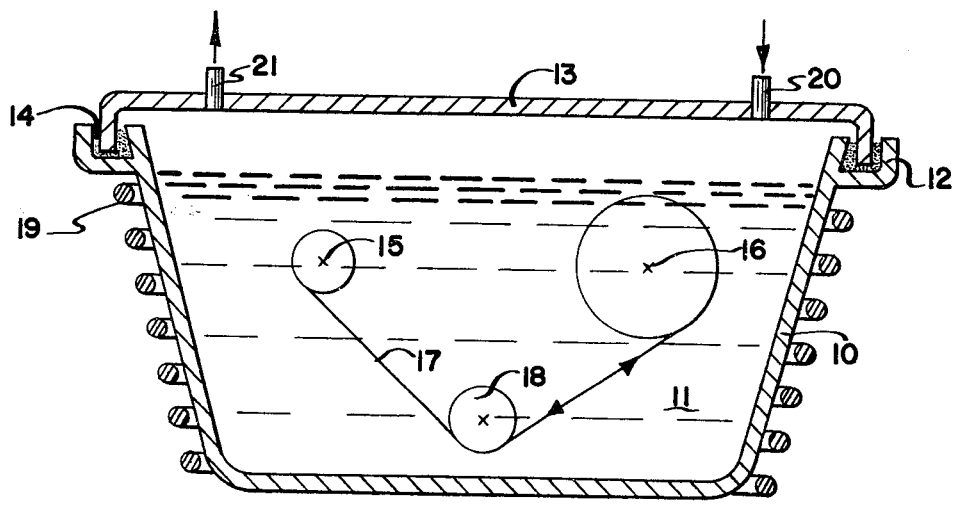
FIG_1
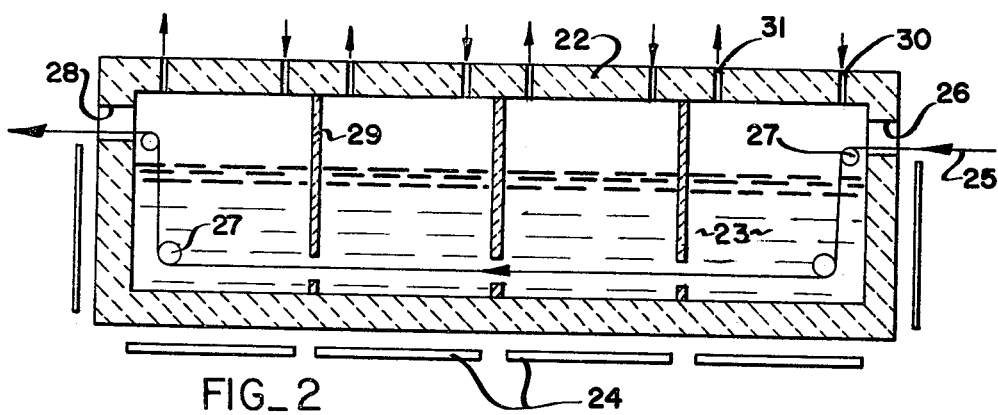
FIG_2
INVENTOR.
MYRON T. CORY
BY
Oberlin, Maky & Donnelly
ATTORNEYS United States Patent Office 3,508,871
Patented Apr. 28, 1970

3,508,871
CARBONIZING FIBROUS MATERIALS
Myron T. Cory, Lewiston, N.Y., assignor, by mesne assignments, to The Carborundum Company, a corporation of Delaware
Filed May 29, 1963, Ser. No. 284,151
Int. Cl. C01b 31/07
U.S. Cl. 23—209.1             11 Claims

ABSTRACT OF THE DISCLOSURE

A process for treating carbonizable fibrous materials comprising (1) contacting the carbonizable fibrous material with a heating medium organic solvent to partially carbonize the fibrous material and removing the tarry residue released by decomposition, (2) separating the fibrous material from the heating medium, (3) further carbonizing the fibrous material in an inert gaseous atmosphere and products made according to this process.

---

There is a growing need for thermally stable and heat protective materials in various fields of scientific endeavor. One class of such materials comprises fibrous bodies or structures in which the fibers are carbonized. For instance, such fibrous bodies are suitable to reinforce structural and ablative plastic composites. A number of precursory organic materials possess the ability to char or carbonize (leave carbonaceous residues) when heated in an inert atmosphere, rather than to melt or otherwise react, and may accordingly be used to form carbon-based products. For example, thermosetting resins like phenol-formaldehyde and the furans which do not melt under heat and can char in an inert atmosphere can be used, especially in thread form. Principally, however, cellulose in all its variety of forms, both natural and synthetic, is best suited for this purpose.

Pyrolysis of cellulosic material, which is not unlike destructive distillation, is quite complex in chemical nature. By-products result from the carbonization whose presence frequently adversely affects the physical characteristics sought in the final product. As the carbonizable material is heated, its structure undergoes considerable change. The material shrinks and loses weight. The chain of the cellulosic macromolecule breaks or condenses, forming carbon residues and venting volatile carbon compounds. Carbonaceous char and tars are deposited, while gases and water vapor are also released. Often foreign substances or impurities from a large number of possible sources are present which further complicate the route of the carbonization and result in unwanted reaction by-products. For instance, such impurities may be reduced to tarry materials or ash by the carbonization process and deposit on the carbonized product. Usually the carbonization continues, stripping away the hydrogen and oxygen atoms from the organic macromolecule, until the final product is largely carbon, 98 percent or higher in the case of graphitic products.

Previously, a careful control of process conditions, such as heating schedules, times of exposure, atmosphere, and the like, were followed in order to obtain desired and reproducible results. In accordance with the present invention, however, the adverse effects of the by-products of carbonization are considerably minimized if not eliminated by removing offending deposits before completing the carbonization to a point desired. Products of improved tensile strength are obtained as well as reproducible results with a minimum attention to processing conditions.

It is, therefore, a principal object to provide an improved carbonization process and resulting product.

Another object is to effect removal of the by-products of carbonization, especially tarry deposits.

A further object is to provide an article of manufacture comprising carbonized cellulosic fibers and having greatly increased tensile strength.

Other objects will become apparent as the description proceeds.

To the accomplishment of the foregoing and related ends, the invention consists of the features hereinafter fully described and particularly pointed out in the claims. The annexed drawing and following disclosure describing in detail the invention, such drawing and disclosure illustrating, however, but one or more of the various ways in which the invention may be practiced.

In the accompanying drawing:

FIGURE 1 is a digrammatic illustration of a batch operation embodying the preferred practice of the invention;

FIGURE 2 is a diagrammatic illustration of a continuous or semi-continuous operation similarly embodying a preferred practice of the invention.

In accordance with the present invention, a carbonizable material is partially carbonized with incident deposition thereon of by-products, simultaneously treated with a solvent to remove at least some of such products, and then further carbonized.

As previously noted, the carbonizable material may be various non-melting charrable materials but is desirably cellulose in virtually any form. For example, rayon, cotton, linen, wood (such as spruce, pine, pith of trees), paper (compressed or rolled), straw, ramie, sisal, hemp, and flax may be used. Similarly, the physical form of the cellulosic material is not critical, although fibrous structures are well adapted for the practice of the invention. Such structures may comprise a single continuous filament, or discontinuous or continuous fibers or yarns (of which only some of the component parts need contain cellulose) arranged in helter-skelter fashion. Usually, however, a cloth or tape, woven or unwoven, is used.

Partial carbonization includes carbonization to a point just short of complete carbonization, although it is preferred not to carry the partial carbonization to that extent. As cellulosic material is heated, the weight loss is greatest at the start and then tapers off rapidly. Cellulosic material having a carbon content of up to 90% by weight is still considered to be only partially carbonized. Ordinarily, the initial carbonization step is of sufficient intensity to cause the carbonizable material to lose about 10% to about 75% of its original weight, and preferably from about 25% to about 60%. As an illustration, satisfactory results have been achieved when the material is heated for the partial carbonization step from about 150° C. to about 400° C. for abount one minute to about fifteen hours.

After partially carbonizing the material, it may be solvent-treated to remove at least some of the incidentally formed by-products which are deposited on the material. This may be accomplished by simply immersing the material in the solvent, or pouring the solvent over the material, or the like. Since only a solvent action may be involved, a large number of organic solvents may be used in which the deposits resulting from carbonization are at least partially soluble. For this purpose, commonly known organic liquid solvents suffice. For example, the following may be employed: tetrahydrofuran, gasoline, naphtha, benzene, lower alkyl substituted benzenes (such as toluene, xylene, and ethyl benzene), spirits, light mineral oil, acetone, ether, methyl alcohol, propyl alcohol, butyl alcohol, furfural alcohol, furfural aldehyde, ethyl acetate, methyl acetate, cellosolve, cellosolve acetate, and dimethyl formamide. It should especially be noted that a solvent action, at least to some extent, is contemplated rather than a mere flushing action which does not provide the results desired.

The especially desired solvents are the halogenated organic solvents because they react with the partially carbonized material. Among this class of solvents the following may be used: carbon tetrachloride, trichloroethylene perchloroethylene, ethylene dichloride, chlorobenzene, dichlorobenzene, ethyl chloride, chloral, the various Freons such as dichlorodifluormethane, bromoform, and ethylene dibromide.

For reasons of safety, a solvent is normally selected for a particular partially carbonized material which under the conditions extant does not readily flash. However, an autoclave and/or an inert atmosphere as described for the partial carbonization step enables the use, if desired, of solvents which otherwise might flash or readily evaporate.

Although I do not limit the invention to any theory, it is postulated that under the usual treatment of carbonizing a strand or cloth, where a plurality of filaments are in juxtaposition, the deposited by-products and especially the tarry deposits "glue" the filaments together at many sites. Because of these resulting anchorage points, the fibers or filaments are not free to slide with respect to each other. Accordingly, the fibers appear to be brittle and friable by breaking sooner in tensile at such sites than would otherwise be the case. The present invention removes deposits which effect these anchorage points and thereby eliminates or reduces such "friable" sites and permits the fibers to move relatively to each other. This imparts increased flexibility both to the fibers themselves and to any products formed from the fibers.

The halogenated solvents accomplish the same results and in addition, as part of their reaction with the partially carbonized material, are believed to effect chain-extension or linking of molecules of the pyrolyzed material to provide still longer carbon molecules. The foregoing may account for the fact that cloths carbonized as herein described have increased tensile strengths of as much as 3,000 percent over competing carbonized cloths.

Following the solvent treatment, the carbonization is continued. Unlike prior techniques of carbonization, which closely followed a heating schedule, usually of ever higher temperatures, the continuing carbonization step of the present invention may take any form desired, that is, it may be at a higher or lower temperature than that used for the partial carbonization and for any time desired. In fact, this subsequent carbonization step need not go to complete carbonization. On the other hand, it may be carried to the extremes needed to produce graphite, for example, 2,700° C. and higher.

As a further modification of the invention, there may be several solvent treatments interspersed between carbonization steps. For instance, there may be three carbonization steps (of which at least two are partial carbonization steps) and two intermediate solvent treatments.

In the preferred practice of the invention, the carbonizable material is initially immersed in a dual purpose solvent and the two heated in combination. In this case, the solvent serves not only to dissolve tarry matter but also to act as a heating medium. This has several advantages. The time necessary to reach a predetermined point in the partial carbonization is appreciably shortened. The oil medium also applies the heat uniformly and steadily to the carbonizable material. Still further, the heating-medium solvent is immediately present and can remove the tars, and other deposits almost as the deposition occurs. The latter is especially true if the carbonizable material is moved relative to the solvent as is hereinafter described in connection with the figures. When a heating medium solvent is used continuously, the dissolution therein of deposits accumulates. This effect of removing tarry deposits and non-water-soluble deposits in general can be strikingly observed by reusing the solvent several times for the purpose indicated and noting the decrease in tensile strength of the resulting final product.

For a heating-medium solvent, any of the solvents previously disclosed can be used in this preferred practice. An autoclave and an inert atmosphere may be used in those cases where necessary, such as for the more volatile solvents having a relatively low flash point, to render such solvents susceptible to a heating action. Ordinarily, however, heating media solvents are selected which are readily adapted for use at atmospheric pressures. Hydrocarbon oils such as the paraffinic based oils are well suited for this purpose. Fuel oils such as fuel oil No. 6 are very satisfactory.

After the partial carbonization in the solvent bath, the material is removed and may be further carbonized as previously disclosed. However, it is also preferred to solvent treat the partially carbonized material after its removal from the bath and prior to continued carbonization. For this purpose, any of the solvents previously disclosed can also be used, although better results are obtained if a solvent is used which is more volatile than the solvent of the bath and miscible therewith. In this case, the more volatile solvent not only insures removal of the undesired by-products but removes as well the heating-medium or bath solvent which may still be clinging to the material and containing in solution the deleterious deposits which it removed.

More particularly, when a heating-medium solvent bath is used composed of a solvent adapted for use at atmospheric pressure such as fuel oil, some of the oil may cling to the partially carbonized material and render it somewhat stiff and of reduced strength after the second carbonization step. It is therefore preferable to treat such partially carbonized material with a second solvent which is more volatile than the first bath solvent and miscible therewith. This has the effect of extracting the first, less volatile solvent from the material being treated. Also, any of the more volatile second solvent which remains on the material is more easily driven off by the heat of the second carbonization step.

FIGURE 1 is a diagrammatic illustration of a batch operation embodying the preferred practice just described. A container 10 holds fuel oil No. 6, indicated at 11, and has a peripheral ledge 12 to receive the downwardly turned rim of a cover 13. Sand 14 provides an air seal in the ledge 12. Two rollers 15 and 16 carry a cloth 17 of cellulosic fibers, the latter passing around an idler roller 18. The rollers are journalled for rotation in conventional bearings and packing glands, not shown.

In operation an electrical heating element 19 heats the container 10 and oil 11. First one roller 15 and the other roller 16 is driven to pass the cloth 17 through the bath 11 from one roller to the other and then back again, until a desired amount of partial carbonization has been reached. While one roller is driven, the other free-wheels. This arrangement automatically accommodates shrinkage of the cloth 17 as it is carbonized. During this time, nitrogen passes through an inlet 20, blankets the bath 11 and then together with other volatiles leaves through an outlet 21. After the cloth 17 is removed, it may be similarly treated in a second more volatile solvent in like apparatus prior to the second carbonization step.

FIGURE 2 illustrates a continuous operation. In this instance, a refractory furnace 22 contains fuel oil indicated at 23 which together are heated by electrical strip heaters 24. A cloth 25 is pulled through a port 26 in the furnace, around idler pulleys 27 and into an oil bath 23, and finally out a port 28. Partitions 29 divide the furnace into compartments and have slots to pass the cloth 25. Each compartment has an inlet 30 and outlet 31 through which nitrogen is purged.

In FIGURE 2, the cloth 25 need not move continuously, depending on the temperature of the bath 23 and degree of carbonization sought. If desired the cloth may be moved intermittently in a semi-continuous process.

Carbonized material prepared as herein described has many uses. Carbon based fibers may be used to reinforce plastics which, in turn, are employed in various re-entry heat shield and rocket exhaust applications. Other uses include that of chopped carbon based fibers for high temperature reinforced paste molded applications, filament winding of nozzles, resistance heating elements, high temperature seals, thermal insulations, rotating shaft seals, and the like.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

EXAMPLE 1

A primary carbonizing treatment was carried out on 30 yards of cloth in a tank or reactor as illustrated in FIGURE 1. The cloth used was Style CX572 Rayon Cloth manufactured by Mount Vernon Mills, Inc. Fabric specifications were: Industrial Rayon Yarn 1650 denier, 2 ply of 19 by 18, weighing approximately 18 ounces/square yard.

The 30 yards of cloth were rolled upon a three inch diameter roll. The roll was then placed in the reactor and unrolled so that the cloth passed under the center idler roll and fastened to the opposite roll. The shaft of each roll extended through the side wall of the reactor where each was alternatively driven by a conventional pulley and belt arrangement.

The reactor was filled with approximately 250 gallons of Striata No. 79 oil, a furnace oil supplied by the Shell Oil Company. This oil was selected because of its high boiling and flash points. The electric heaters were now energized. Once the oil became fluid enough a variable drive was connected to an external V-belt pulley on the empty roll and thereby turned until the cloth passed from the full roll to the driven roll. The procedure was then reversed, so that the material moved from one roll to the other. The speed of rotation was set so that the winding took approximately 45 minutes for the original 30 yards.

When the oil temperature reached 220° F., the entrapped moisture began boiling off causing the oil to foam. The oil temperature was held at 250° F. for approximately two hours or until all foaming stopped. The reactor cover was next placed on the vessel and nitrogen applied through an inlet in the cover. The oil temperature was raised until it reached 605° C. At this time a standard controller was used to maintain this temperature for about 10 hours. The rolls were kept rotating during this period and until oil was drained from the reactor.

After draining the oil, 110 gallons of trichlorethylene were put in the reactor to extract the oil and any tars still on the cloth. The trichlorethylene was heated to 175° F. and the cloth moved through it for 10 hours. The trichlorethylene was drained and the cloth removed from the reactor.

The cloth was then placed in a cylindrical basket and lowered into a tank of trichlorethylene having a temperature of 175° F. A still was connected to the tank so that clean trichlorethylene flowed through the cloth continuously. This step was used to completely extract all oil from the cloth and also to permit a reaction between the trichlorethylene and the partially carbonized cloth. Although useful, this separate cleaning step is not essential.

After 32 hours the cloth was removed from the tank and hung to dry. The cloth was then wrapped on a roll and placed in an intermediate carbonizing vessel having a nitrogen atmosphere and heated again. The temperature was raised to about 725° F. over about 20 hours and then maintained at that value for an additional three hours. after cooling to room temperature, the cloth was removed and placed in the trichlorethylene tank to remove any soluble tars created by the intermediate carbonization step and for further reaction between the trichlorethylene and partially carbonized cloth. After 23 hours the cloth was dried and prepared for final carbonization. The cloth was loosely wound on a graphite roll and placed in a carbonizing tube-shaped furnace. This furnace was gradually heated to 1560° F. in about 19 hours. Upon reaching 575° F. during this rise, nitrogen at 40 cubic feet per hour and natural gas at 10 cubic feet per hour were applied to the tube. After the furnace had maintained a temperature of 1560° F. for three hours, it was allowed to cool. The cloth was then removed and inspected. A one yard sample of the cloth was tested for properties according to ASTM specification and had the following values indicated in Table A for specimen 1. To illustrate the substantial improvement over prior cloths, data for specimens 2 and 3 are given. This prior art data appeared in "Chemical Engineering Progress," October 1962, pages 45 and 46. The substantial increase in comparative tensile strength for specimen 1 of the present invention is especially striking.

TABLE A

| Property | Specimen 1 | Specimen 2[1] | Specimen 3[2] |
|---|---|---|---|
| Weight, oz./yd.² | 8.74 | 7.5 | 7.5 |
| Gauge, inches | 0.020 | 0.026 | 0.021 |
| Type | (³) | (³) | (³) |
| Count, yarns/in.: | | | |
| Warp | 27.2 | 27 | 52 |
| Fill | 23.2 | 23 | 46 |
| Tensile breaking strength, lb./in.², 70° F.: | | | |
| Warp | 135 | 6.5 | 17.3 |
| Fill | 73 | 3.8 | 9.0 |
| Grab test data, lb./in.²: | | | |
| Warp | 148 | | |
| Fill | 94 | | |

[1] Trade name: "VCA", supplied by National Carbon Co.
[2] Trade name: "CCA-1", supplied by H. I. Thompson Fiber Glass Co.
[3] Continuous.

EXAMPLE 2

In this example, high strength carbon cloth was produced. An amount of 285 feet of style CX572 Rayon Cloth manufactured by the Mount Vernon Mills, Inc. was used. Fabric specification were the same as in Example 1.

The cloth was placed in a carbonization furnace and processed identically with the primary carbonization step of Example 1. The heating and cooling procedures were also maintained according to the primary carbonization step of Example 1.

After cooling, the cloth was removed from the furnace and placed in a basket and then in a tank of trichlorethylene tank. Fresh trichlorethyene was continually circulated through the tank to promote the extraction of the Shell oil from the primary carbonization step. After 18 hours the cloth was removed from the tank and hung to dry.

The partially carbonized cloth was supported on a rack and placed in the final carbonization tube furnace. The furnace and cloth were gradually heated to 1544° F. over a period of about 22 hours and held at that temperature for an additional three hours. After cooling in the furnace, the cloth was removed and tested.

The cloth had the following properties:

```
Construction:
  Weight (ounces/square yard)¹_____  8.5-9.5
  Thickness (inches)¹_____  .020-.026
Count (yarn/inch)¹:
  Warp_____  26-28
  Fill_____  26-28
Denier (yarn)_____  580/2-606/2
Type of yarn_____  (²)
Width of fabric (inches)_____  42 (approximate)
Properties, Strength¹, Warp/Fill:
  Grab tensile_____  86      84
  Elongation at failure, percent_____  7.4     5.6
  Cut strip tensile (lbs./in. width)_____  64      64
  Elongation at failure, percent_____  6.8     3.7
  Single strand tensile (lbs.)_____  2.38    2.10
  Elongation at failure, percent_____  1.33    1.73
  Electrical resistance, one inch wide strip (ohms/
    inch of length)_____  0.5
  Filament (ohm/inches)_____  0.0016
```

[1] ASTM-D-39-61.

It will now be apparent that I have provided an improved carbonization process and resulting product in which undesired by-products of carbonization, and especially tarry deposits, are removed. The invention is particularly applicable to cellulosic materials. Articles of cellulosic fibers treated in accordance with the invention have appreciably increased tensile strength.

Other modes of applying the principle of the invention may be employed, change being made as regards the details described, provided the features stated in any of the following claims or the equivalent of such be employed.

I, therefore, particularly point out and distinctly claim as my invention:

1. A process for treating fibrous materials carbonizable in an inert atmosphere and non-melting to cause substantial decomposition and carbonization thereof, comprising the steps for
   (1) heating said carbonizable material by contacting it under non-oxidizing conditions with a heating-medium organic liquid solvent to cause partial decomposition and carbonization of said fibrous material, said solvent being substantially non-volatile at the temperatures and pressures employed and a solvent for removing a portion of the tarry residue released by decomposition of said fibrous material,
   (2) separating the partially carbonized fibrous material from said solvent, and
   (3) heating said partially carbonized fibrous material in an inert gaseous atmosphere to further carbonize said fibrous material.

2. A process according to claim 1 wherein the fibrous materials are selected from the group consisting of cellulose, phenol formaldehyde resins and furan resins.

3. A process according to claim 1 wherein the fibrous materials are cellulose fibers and the partial decomposition in step (1) results in a weight loss to the fibers between 10 and 75%.

4. A process according to claim 2 wherein the heating in step (1) is in a temperature range between 150 and 400° C.

5. A process according to claim 1 wherein the partial carbonization results in fibrous materials containing up to about 90% by weight carbon.

6. A process according to claim 1 wherein the fibrous materials are substantially entirely carbonized in the final step.

7. A process according to claim 1 wherein the heating in step (3) is at a temperature above about 2700° C. resulting in graphitization of the fibrous materials.

8. A process for treating fibrous materials carbonizable in an inert atmosphere and non-melting to cause substantial decomposition and carbonization thereof, comprising the steps for
   (1) heating said carbonizable material by contacting it under non-oxidizing conditions with a heating-medium organic liquid solvent to cause partial decomposition and carbonization of said fibrous material, said solvent being substantially non-volatile at the temperatures and pressures employed and a solvent for removing a portion of the tarry residue released by decomposition of said fibrous material,
   (2) separating the partially carbonized fibrous material from said solvent,
   (3) treating the partially carbonized fibrous materials in a second organic liquid solvent to remove the first solvent and tarry residue dissolved therein, and
   (4) heating said partially carbonized fibrous material in an inert gaseous atmosphere to further carbonize said fibrous materials.

9. A process according to claim 8 in which the heating medium solvent is a hydrocarbon oil.

10. A process according to claim 9 in which the second solvent is a chlorinated solvent.

11. A process according to claim 8 wherein the second solvent is an organic liquid more volatile than the heating medium solvent.

References Cited

UNITED STATES PATENTS

| 2,088,422 | 7/1937 | Kemmer | 264—29 |
| 3,011,981 | 12/1961 | Soltes | 252—502 |
| 3,116,975 | 1/1964 | Cross et al. | 23—209.2 X |
| 3,179,605 | 4/1965 | Ohsol | 23—209.2 X |
| 3,285,696 | 11/1966 | Tsunoda | 23—209.1 |

FOREIGN PATENTS

| 323,595 | 3/1917 | Germany. |

OTHER REFERENCES

Vosburgh: Textile Research Journal, November 1960, pages 882, 883, and 887, Scientific Library.

EDWARD S. MEROS, Primary Examiner

U.S. Cl. X.R.

23—209.4